(12) United States Patent
Tailliet

(10) Patent No.: US 8,948,209 B2
(45) Date of Patent: Feb. 3, 2015

(54) TRANSMISSION OVER AN 12C BUS

(75) Inventor: François Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 234 days.

(21) Appl. No.: 13/140,561

(22) PCT Filed: Dec. 10, 2009

(86) PCT No.: PCT/FR2009/052480

§ 371 (c)(1),
(2), (4) Date: Jul. 6, 2011

(87) PCT Pub. No.: WO2010/076455

PCT Pub. Date: Jul. 8, 2010

(65) Prior Publication Data

US 2011/0255560 A1    Oct. 20, 2011

(30) Foreign Application Priority Data

Dec. 17, 2008 (FR) ...................................... 08 58732

(51) Int. Cl.
*H04J 3/06* (2006.01)
*H04L 12/66* (2006.01)
*G06F 13/00* (2006.01)

(52) U.S. Cl.
USPC ............ 370/503; 370/352; 710/105; 710/110

(58) Field of Classification Search
USPC ................. 370/328–353, 438–455, 503–509;
710/62–110, 305–315; 714/43–56;
713/401–600
See application file for complete search history.

(56) References Cited

U.S. PATENT DOCUMENTS

| 7,003,602 | B2 * | 2/2006 | Selz et al. ...................... 710/100 |
| 7,478,286 | B2 * | 1/2009 | Humphrey et al. ............. 714/43 |
| 7,562,172 | B2 * | 7/2009 | Deshpande .................... 710/110 |
| 7,606,956 | B2 * | 10/2009 | Deshpande et al. .......... 710/110 |
| 7,653,757 | B1 * | 1/2010 | Fernald et al. ..................... 710/3 |
| 7,739,435 | B2 * | 6/2010 | Gideons ........................ 710/105 |
| 7,984,214 | B2 * | 7/2011 | Heizmann ..................... 710/105 |
| 7,999,483 | B2 * | 8/2011 | Trattler ...................... 315/241 P |
| 8,161,224 | B2 * | 4/2012 | Laurencin et al. ............ 710/315 |
| 8,232,820 | B2 * | 7/2012 | Wang ............................... 326/30 |
| 8,452,897 | B1 * | 5/2013 | Fernald et al. .................... 710/3 |
| 2005/0165989 | A1 * | 7/2005 | Kim .............................. 710/260 |
| 2006/0259538 | A1 * | 11/2006 | Ewing et al. ................. 709/200 |
| 2008/0162758 | A1 | 7/2008 | Gideons |
| 2008/0177918 | A1 * | 7/2008 | Lee et al. ...................... 710/110 |
| 2008/0250184 | A1 * | 10/2008 | Sheafor et al. ............... 710/306 |

OTHER PUBLICATIONS

Translation of the Written Opinion of the International Searching Authority dated Jul. 5, 2011 from corresponding International Application No. PCT/FR2009/052480.
International Search Report dated Mar. 25, 2010 from corresponding International Application PCT/FR2009/052480.
Anonymous: *The I²C-Bus Specification*, Philips Semiconductors, Version 2.1, Jan. 1, 2000, pp. 1-46.

* cited by examiner

*Primary Examiner* — Man Phan
(74) *Attorney, Agent, or Firm* — Seed IP Law Group PLLC

(57) ABSTRACT

A method and a system of multichannel transmission over a twin-wire bus including a data signal and a synchronization signal, data of a first channel being transmitted by a state coding of the data signal for a time period containing a first state of the synchronization signal, data of a second channel being transmitted by pulse coding outside of said period.

16 Claims, 4 Drawing Sheets

US 8,948,209 B2

TRANSMISSION OVER AN I2C BUS

CROSS REFERENCE TO RELATED APPLICATIONS

This application is a U.S. National Stage Patent Application based on PCT Application Number PCT/FR2009/052480, filed on Dec. 10, 2009, entitled TRANSMISSION OVER I2C BUS, which application claims the priority benefit of French patent application number 08/58732, filed on Dec. 17, 2008, entitled TRANSMISSION OVER I2C BUS, which applications are hereby incorporated by reference to the maximum extent allowable by law.

BACKGROUND OF THE INVENTION

1. Field of the Invention

The present invention generally relates to electronic circuits and, more specifically, to systems in which several circuits are capable of communicating over a twin-wire bus comprising a data wire and a wire conveying a synchronization signal. The present invention more specifically applies to an I2C bus.

2. Discussion of the Related Art

Communication protocols on twin-wire buses use, in addition to a reference signal (generally, the ground) representing one of the two states of the binary signals, a data signal (SDA) and a clock or synchronization signal (SCL). It is thus spoken of a twin-wire bus, but a reference level is further required.

A current example is the I2C protocol, used to communicate between a master device or circuit which generates the synchronization signal on the clock wire as well as a data signal on the data wire towards a slave device or circuit. The slave device (receiver) generates an acknowledgement bit that it transmits over the data wire. In practice, the bus conductors will be, in the idle state, at a voltage different from the reference voltage, this second voltage representing the other one of the two states of the binary signals.

It would be desirable to take advantage of the presence of an I2C bus to transmit other data than those of the I2C protocol. In other words, it would be desirable to use the structure of a twin-wire bus for another communication channel.

SUMMARY OF THE INVENTION

An object of the present invention is to provide a multi-channel transmission over a twin-wire bus.

Another object is to provide an architecture which is simple to implement and compatible with usual I2C system architectures.

To achieve all or part of these objects as well as others, at least one embodiment of the present invention provides a method of multichannel transmission over a twin-wire bus comprising a data signal and a synchronization signal, data of a first channel being transmitted by a state coding of the data signal during a time period comprising a first state of the synchronization signal, data of a second channel being transmitted by pulse coding outside of said time period.

According to an embodiment of the present invention, a first state of the second channel is coded by a pulse, a second state of the second channel being coded by the absence of a pulse.

According to an embodiment of the present invention, the method is applied to the I2C protocol.

According to an embodiment of the present invention, said pulse is generated during a time period comprised between a hold time which follows an edge of a first type of the synchronization signal and a following edge of a second type.

At least one embodiment of the present invention also provides a system of multichannel transmission over a twin-wire bus, comprising:
means for transmitting a first channel respecting the I2C protocol; and
means for transmitting a second pulse channel outside of periods when the I2C protocol data are stable.

At least one embodiment of the present invention also provides a transmitter of a multichannel transmission over a twin-wire bus.

At least one embodiment of the present invention also provides a receiver of a multichannel transmission over a twin-wire bus.

At least one embodiment of the present invention also provides a transceiver of a multichannel transmission over a twin-wire bus.

BRIEF DESCRIPTION OF THE DRAWINGS

The foregoing objects, features, and advantages of the present invention will be discussed in detail in the following non-limiting description of specific embodiments in connection with the accompanying drawings, among which.

The same elements have been designated with the same reference numerals in the different drawings.

DETAILED DESCRIPTION

For clarity, only those steps and elements which are useful to the understanding of the present invention have been shown and will be described. In particular, the generation of the data to be transmitted and the exploitation made by the receive circuit of these data have not been detailed, the present invention being compatible with the data usually transmitted between two or more circuits over a twin-wire bus.

Figure 1:
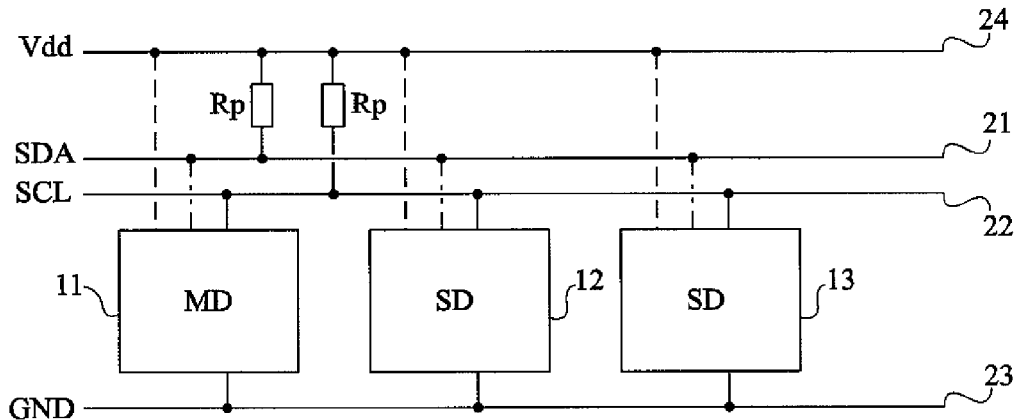
FIG. 1 very schematically shows in the form of blocks an example of a system using an I2C bus.

FIG. 1 is a simplified representation of an electronic device or system exploiting a twin-wire bus, for example of I2C type. Several circuits 11, 12, 13 are connected to a wire 21 of transmission of a data signal SDA, to a wire 22 of transmission of a synchronization or clock signal SCL, and to a wire 23 conveying a voltage reference signal (typically the ground, GND). Circuits 11, 12, and 13 and other circuits connected to the I2C bus or belonging to the electronic device may be powered by the same voltage or by different voltages. For example, circuits 11, 12, and 13 are connected to a wire 24 conveying a supply signal Vdd positive with respect to ground GND. Wires 21 and 22 are individually connected by pull-up resistors Rp to wire 24, so that signals SDA and SCL are idle in the high state.

For a data transmission over the I2C wire, one of the circuits (for example, circuit 11) behaves as a master device (MD) and provides synchronization signal SCL. The other circuit(s) 12 and 13 then have a slave status (SD) to receive the data transmitted by circuit 11. These data may be intended for several slave circuits or for a single one. The I2C protocol provides transmitting a device address before a data byte. The same circuit may have at times a master function, and at other times a slave function according to the direction of the communication.

Figure 2:
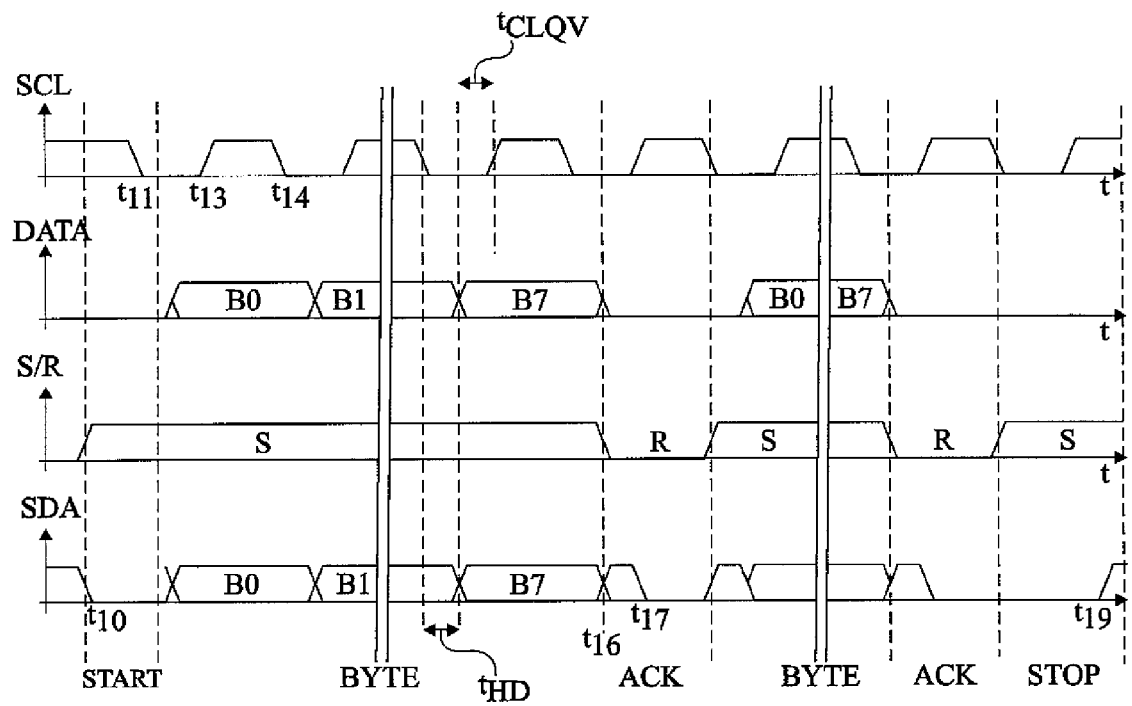
FIG. 2 shows timing diagrams illustrating the operation of an I2C bus.

FIG. 2 shows timing diagrams illustrating the operation of an I2C bus. These timing diagrams show examples of shapes of signal SCL, of a data signal DATA to be transmitted by a master device towards one or several slave devices, of a signal S/R internal to the master device, and of signal SDA. In the example of FIG. 2, a periodic synchronization signal of duty cycle ½ is assumed, but this is not required.

The I2C protocol defines a communication start bit (START) by a switching to the low state (time $t_{10}$) of signal SDA while signal SCL remains in the high state. This switching is caused by the device which takes a master status for the communication. The master device then switches signal SCL to the low level (time $t_{11}$). Then, it imposes the state of signal SDA according to the state of first bit B0 of the byte to be transmitted. The state of signal SDA is enabled by the period (time $t_{13}$ to $t_{14}$) in the high state of signal SCL. When signal SCL returns to the low state, the master circuit continues the operation with the next bits B1, . . . B7 until the full byte has been transmitted.

At the end of the last bit B7 (time t16) of the first byte, the master device lets go of signal SDA which thus returns to the high state, and sets its port connected to wire 21 to read the state of signal SDA (signal S/R at low state R).

The different slave circuits detect the beginning of a communication by monitoring the respective states of signals SCL and SDA. When signal SDA is pulled to the low state (time $t_{10}$) while signal SCL remains in the high state, the slave devices know that a transmission is about to begin.

Most often, the first byte sent by the master device comprises seven address bits identifying the addressee circuit, followed by a bit indicative of the operation (read/write) desired by the master device.

The different slave circuits detect the transmitted data and, in particular, determine based on the first byte forming the address of the addressee whether the next byte(s) are intended for them.

At the end of the first byte, the slave circuit identified by the address acknowledges (ACK) the transmitted byte by pulling signal SDA to the low state. This transition (time $t_{17}$) is detected by the master circuit which can then transmit the next byte and so on until the end of the transmission. For this transmission of the next byte(s), the master circuit switches back the state of its port connected to SDA wire 21 to impose this state (signal S/R in position S).

Once the data byte has been transmitted and the acknowledgement (ACK) has been received from the slave circuit, the master circuit imposes a stop condition (STOP) by switching signal SDA to the high state (time $t_{19}$) while signal SCL is also in the high state.

Figure 3:
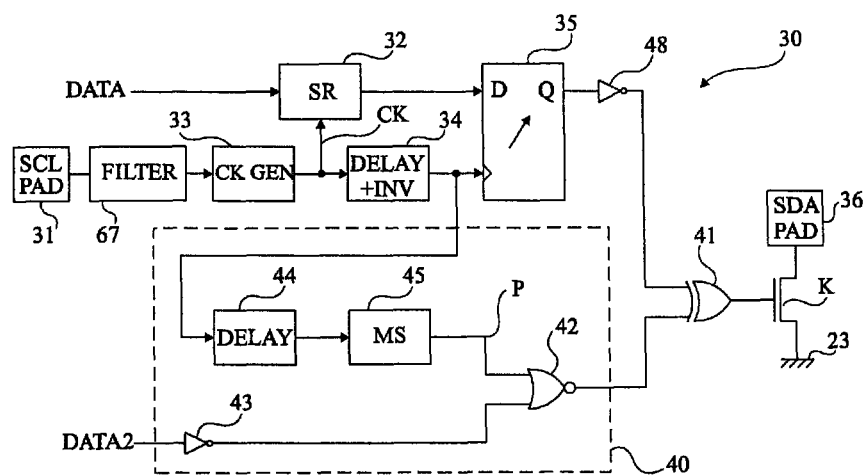
FIG. 3 is a block diagram of an embodiment of a circuit of multichannel transmission over an I2C bus.

FIG. 3 is a block diagram of a transmit circuit 30 which comprises a master device for sending data over an I2C bus. To simplify the representation of FIG. 3, only the elements constitutive of the circuit driving wire 21 (pad 36—SDA PAD) have been shown, the other components of the master device being usual, in particular the elements generating the synchronization signal SCL imposed on pad 31 (SCL PAD) of circuit 30 connected to wire 22. Signal DATA of data to be transmitted, generated by other circuits (not shown) of the master device, is transmitted to a shift register 32 (SR) triggered by an internal clock signal CK generated by a circuit 33 (CK GEN) based on signal SCL. In practice, signal SCL is filtered and shaped (block 67, FILTER) before reaching circuit 33. Signal CK is used not only as a signal for triggering shift register 32 but also, after having crossed a delay and inverting element 34 (DELAY+INV), to trigger a flip-flop 35 active on rising edges. Flip-flop 35 receives, on its D data input, the output of shift register 32 and provides, on its direct Q output, a control signal intended for a switch K (for example, a MOS transistor) capable of pulling pad 36 of connection to wire 21 to ground.

The elements which have just been described correspond to those of a usual transmit circuit and enable to provide the timing diagrams of FIG. 2. Typically, delay circuit 34 holds the data at the output of flip-flop 35 for a determined time period after the falling edge of signal SCL.

In the example shown in FIG. 3, the transmit circuit further comprises a circuit 40 capable of stacking a second communication channel on the I2C bus. For this purpose, the control terminal of switch K receives the output of a logic XOR-type function 41 having a first input receiving the inverse (inverter 48) of the Q output of flip-flop 35 and having its second input connected to the output of circuit 40. This output corresponds to the output of a logic NOR-type function 42 combining the inverse (inverter 43) of a data signal DATA2 to be transmitted with a triggering signal P. Triggering signal P is a pulse signal generated from signal CK by means of a delay circuit 44 (DELAY) and of a monostable circuit 45 (MS). The function of circuit 44 is to set a delay of occurrence of a pulse corresponding to a coding of the datum of the secondary channel after the delivery of the main datum of the I2C bus. Monostable circuit 45 determines the duration of the secondary pulse. Finally, gate 41 mixes data DATA of the I2C bus with data DATA2 of the secondary channel.

Figure 4:
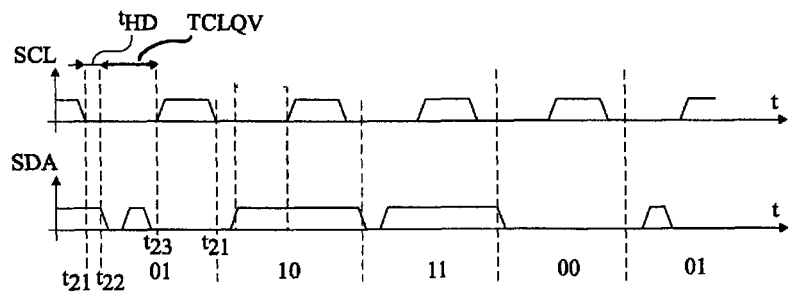
FIG. 4 shows timing diagrams illustrating a multichannel transmission over an I2C bus.

FIG. 4 shows timing diagrams illustrating an example of shapes of signals SCL and SDA imposed by a circuit 30 of the type illustrated in FIG. 3. In the example of FIG. 4, signal SCL has been shown with a duty cycle different from ½.

FIG. 4 illustrates four examples 01, 10, 11, 00 of possible combinations between the data signal (state 1 or 0) of the I2C bus and the signal (state 1 or 0) of the secondary channel. The data of the secondary channel are coded in the form of a pulse signal generated outside of the period (high state of signal SCL—times $t_{23}$ to $t_{21}$) when the main data signal is enabled.

The I2C protocol provides time windows from the falling edge of synchronization signal SCL. Typically, a time period $t_{HD}$ (of approximately 200 ns for a 400-kHz protocol) sets a minimum interval between the falling edge of signal SCL (time $t_{21}$) and the coding of the next data, and a maximum time period $T_{CLQV}$ (approximately 900 ns in the above example) between the presentation of the data (time $t_{22}$) and the next rising edge (time $t_{23}$) of signal SCL. The minimum duration of the low stages of signal SCL is also set (approximately 1,300 ns in the above example). The interval (times $t_{22}$ to $t_{23}$) between the coding and the rising edge of signal SCL leaves a free interval in the I2C protocol. The secondary channel is coded during periods when synchronization signal SCL is in the low state (having respected time period $t_{HD}$). In the shown example, if a pulse (succession of a low state and of a high state) is present, this corresponds to transmitting a state 1 on the second channel. If no pulse is present, this corresponds to transmitting a low state on this second channel.

Advantage is thus taken of the existence of an unexploited time period in the I2C bus. Typically, in an I2C protocol at a 400-kHz frequency, this corresponds to a 700-ns period between times $t_{22}$ and $t_{23}$ when the state of signal SDA is not taken into account by the receivers of the I2C protocol. This time period is exploited for the pulse transmission of the second channel.

The slave circuits are capable of detecting such pulse signals.

Figure 5:
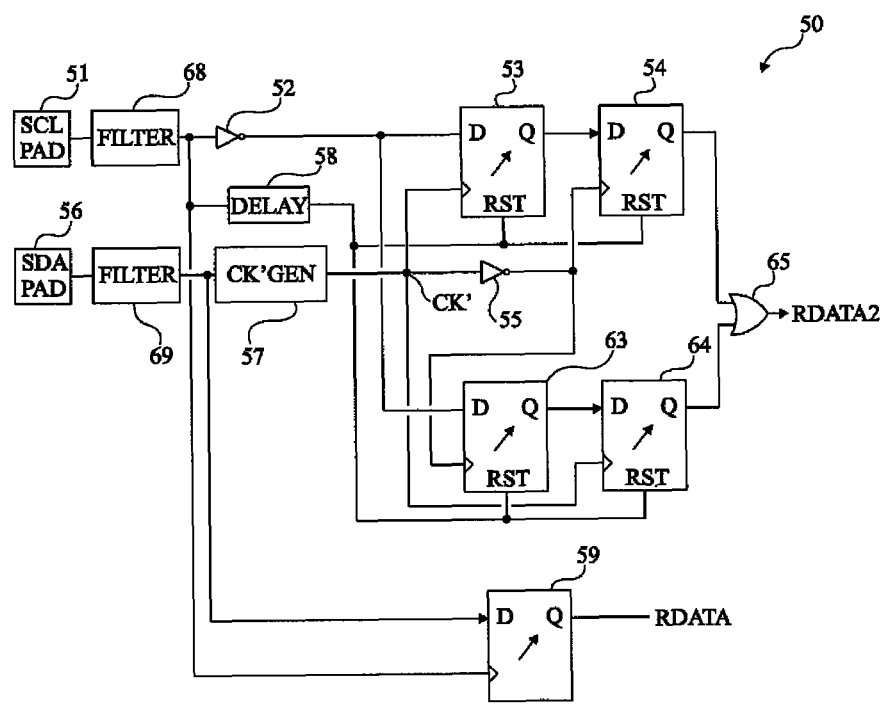
FIG. 5 is a block diagram showing an embodiment of a receive circuit adapted to the multichannel I2C bus.

FIG. 5 is a block diagram of an embodiment of a receive circuit 50 on the slave device side. To simplify the present description, only the receive portion has been illustrated, the transmit portion of an acknowledgement bit of the I2C channel remaining usual.

Usually for an I2C protocol, the signal sampled from a pad 51 (SCL PAD) connected to wire 22 is filtered and shaped (block 68, FILTER) to be provided to the clock input of a flip-flop 59 having its D data input connected, via a filter and shape circuit (block 69, FILTER), to a pad 56 (SDA PAD) intended to be connected to wire 21. The Q output of flip-flop 59, active on rising edges, provides signal RDATA corresponding to the decoded I2C bus.

To decode the data of the second channel, the output of filter 68 is inverted (inverter 52) to be provided to the D data input of a flip-flop 53. The Q output of flip-flop 53 is sent onto the D data input of a flip-flop 54. Flip-flops 53 and 54 are active on rising edges and are respectively triggered by the rising edges of a triggering signal CK' and by the falling edges (inverter 55) of signal CK'. As a variation, flip-flop 54 is active on falling edges. Flip-flops 53 and 54 are reset (RST) by the rising edges of filtered and delayed signal SCL (block 58, DELAY). Triggering signal CK' is extracted from signal SDA by a clock generator 57 (CK'GEN) having an input connected to the output of filter 69. The output signal of inverter 52 is also sent onto the D data input of a flip-flop 63 having its Q output connected to the D data input of another flip-flop 64. Flip-flops 63 and 64 are both active on rising edges and are respectively triggered by the inverse (output of inverter 55) of signal CK' and by this signal CK'. In the same way as for flip-flops 53 and 54, the resetting of flip-flops 63 and 64 is delayed with respect to each rising edge of signal CK'.

The function of flip-flops 53 and 54 is to detect a transition 010 on signal SDA when signal SCL is in the low state.

The function of flip-flops 63 and 64 is to detect a transition 101 on signal SDA when signal SCL is in the low state.

The Q outputs of flip-flops 54 and 64 are combined by an OR-type function 65 to provide a signal RDATA2 representing the second communication channel. In fact, function 65 detects a high state on the secondary channel.

Figure 6:
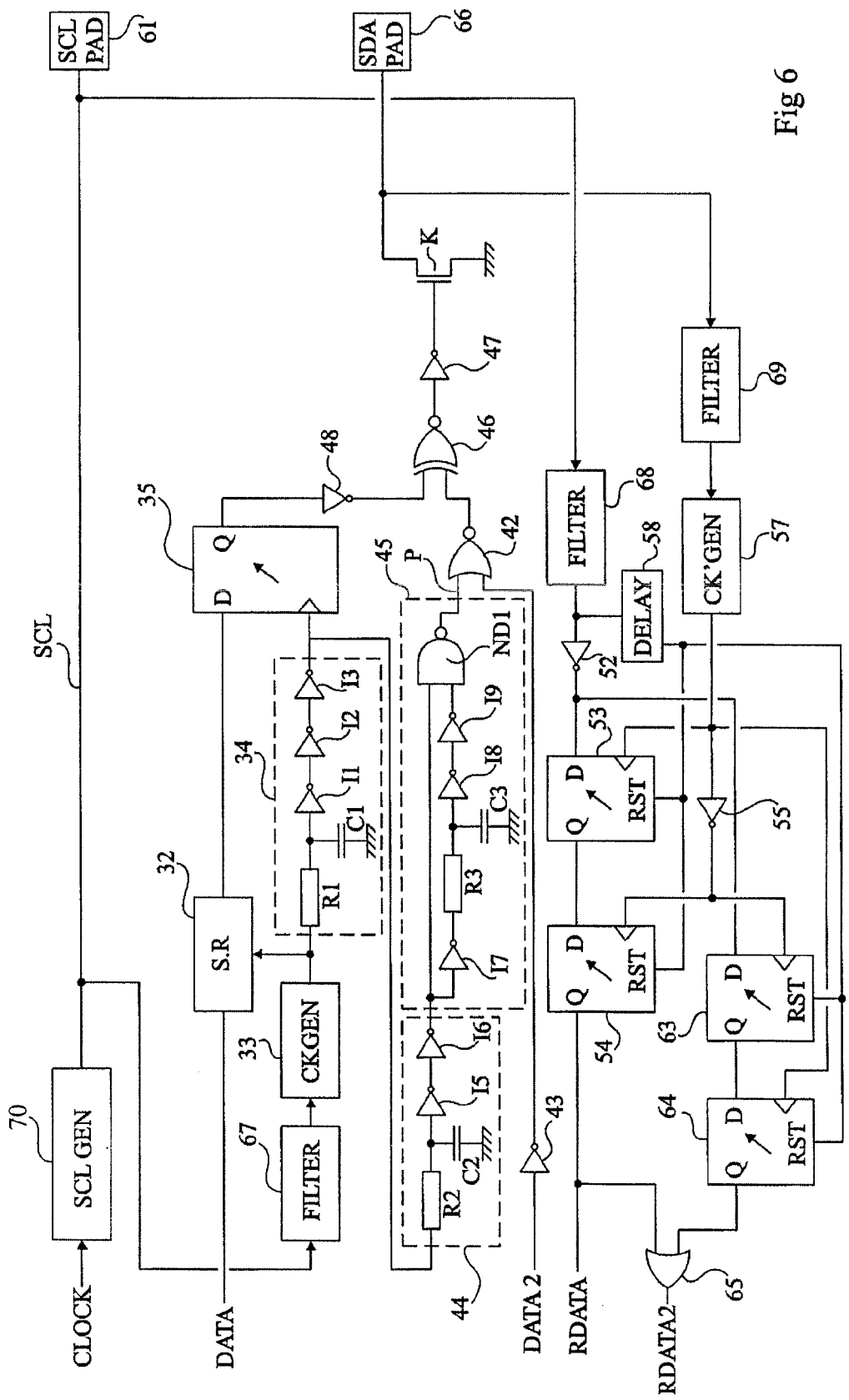
FIG. 6 is a block diagram of an example of an electronic circuit integrating the circuits of multichannel transmission and reception over an I2C bus.

FIG. 6 is an example of an electronic circuit comprising a transmit circuit and a receive circuit of the I2C bus. Frequently, a same device connected to the bus can transmit (behave as a master) and receive (behave as a slave). The device can then comprise separate ports connected to its transmit and receive circuits. According to another example illustrated in FIG. 6, same ports 61 (SCL PAD) and 66 (SDA PAD) are alternately dedicated to receiving or to transmitting.

When the device operates as a master, it generates, based on a clock signal CLOCK (for example, its internal clock), synchronization signal SCL by means of a generator 70 (SCL GEN). As described in relation with FIG. 3, signal SCL is used to generate triggering signal CK of the transmit circuits. As compared with the representation of FIG. 3, FIG. 6 illustrates an example of detailed circuits of delay elements 34, 44 and of monostable element 45 as well as a variation of the logic functions.

Delay circuit 34 is formed of a resistive and capacitive cell (series resistor R1 and capacitor C1 connected to ground), and of three inverters I1, I2, and I3 in series. The dimensions to be given to the delay circuit depend on the application and on the transmit frequency of the I2C protocol. Taking the example of a 400-kHz I2C bus, this circuit 34 holds data DATA approximately 200 ns after the falling edge of signal SCL.

Delay circuit 44 is formed of a resistive and capacitive circuit (series resistor R2 and capacitor C2 connected to ground) and of two inverters I5 and I6 in series, which determine the delay of occurrence of the pulse of the secondary signal after the data has come out of the I2C bus.

Monostable circuit 45 comprises a resistive and capacitive cell (series resistor R3 and capacitor C3 connected to ground) and three inverters I7, I8, and I9 in series. In the shown example, a first inverter I7 is located upstream of cell R3-C3. Circuit 45 further comprise a NAND-type gate ND1 having a first input receiving the output of last inverter I9 and having its second input directly receiving the output of the last inverter I6 of delay circuit 44. Gate 41 of FIG. 3 is replaced with an XNOR gate 46 followed by an inverter 47.

When the circuit operates as a slave, pads 61 and 66, respectively connected to the input of the two filters 68 and 69, receive the signals originating from the master circuit. The example of the receive circuit of FIG. 6 corresponds to that of FIG. 5.

To form a circuit capable of only operating as a slave (for example, an EEPROM), generator 65 and its input CLOCK are omitted, signal SCL being all the time extracted from pad 61.

Various embodiments of the present invention have been described. Several alterations and modifications are within the abilities of those skilled in the art. In particular, the states taken as an example may be inverted according to the used protocol. Further, the practical implementation of the present invention is within the abilities of those skilled in the art based on the functional indications given hereabove. In particular, the examples of input and output circuits may be modified or performed by software functions.

Having thus described at least one illustrative embodiment of the invention, various alterations, modifications, and improvements will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of multichannel transmission over a twin-wire bus comprising a data signal and a synchronization signal, comprising transmitting data of a first channel during a first time period following a transition of the synchronization signal to a first state, and transmitting data of a second channel during a second time period, different from the first time period, following said transition of the synchronization signal to said first state, wherein the data of the first channel and the data of the second channel are transmitted by a single transmit circuit connected to the twin-wire bus.

2. The method of claim 1, wherein a first state of the second channel is coded by a pulse, a second state of the second channel being coded by the absence of a pulse.

3. The method of claim 1, applied to an I2C protocol.

4. The method of claim 2, wherein said pulse is generated for a time period between a hold time which follows an edge of a first type of the synchronization signal and a following edge of a second type.

5. A system of multichannel transmission over a twin-wire bus, comprising:

a first circuit configured to transmit data over the twin-wire bus on a first channel according to an I2C protocol; and a second circuit configured to transmit data over the twin-wire bus on a second channel during free intervals in the I2C protocol, wherein the first circuit and the second circuit are elements of a single transmit circuit connected to the twin-wire bus.

6. A method for transmitting data over a twin-wire bus carrying a data signal and a synchronization signal, comprising:

transmitting first data on a first channel of the twin-wire bus during a first time period following a transition of the synchronization signal to a first state; and transmitting second data on a second channel of the twin-wire bus during a second time period following said transition of the synchronization signal to said first state, wherein the first and second time periods of the synchronization signal are non-overlapping in time and wherein the first channel is independent of the second channel, wherein the second time period begins after a hold time which follows a falling edge of the synchronization signal and ends on a next rising edge of the synchronization signal.

7. A method for transmitting data as defined in claim 6, wherein the first data is transmitted according to an I2C bus protocol.

8. A method for transmitting data as defined in claim 6, wherein the second data is transmitted by pulse coding.

9. A method for transmitting data as defined in claim 6, wherein transmitting data on the second channel comprises determining the second time period relative to transitions of the synchronization signal between first and second states.

10. A circuit for transmitting data over a twin-wire bus carrying a data signal and a synchronization signal, comprising:

a first circuit configured to transmit first data on a first channel of the twin-wire bus during a first time period following a transition of the synchronization signal to a first state; and a second circuit configured to transmit second data on a second channel of the twin-wire bus during a second time period following said transition of the synchronization signal to said first state, wherein the first and second time periods of the synchronization signal are non-overlapping in time and wherein the first channel is independent of the second channel, wherein the second time period begins after a hold time following a falling edge of the synchronization signal and ends on a next rising edge of the synchronization signal.

11. A circuit for transmitting data as defined in claim 10, wherein the first data is transmitted according to an I2C bus protocol.

12. A circuit for transmitting data as defined in claim 10, wherein the second circuit is configured to delay transmission of the second data relative to transmission of the first data.

13. A circuit for transmitting data as defined in claim 10, wherein the second circuit is configured to determine the second time period relative to transitions of the synchronization signal between first and second states.

14. A method for receiving data over a twin-wire bus carrying a data signal and a synchronization signal, comprising:

receiving first data on a first channel of the twin-wire bus during a first time period following a transition of the synchronization signal to a first state; and receiving second data on a second channel of the twin-wire bus during a second time period following said transition of the synchronization signal to said first state, wherein the first and second time periods of the synchronization signal are non-overlapping in time and wherein the first channel is independent of the second channel, wherein the second time period begins after a hold time following a falling edge of the synchronization signal and ends on a next rising edge of the synchronization signal.

15. A circuit for receiving data over a twin-wire bus carrying a data signal and a synchronization signal, comprising:

a first circuit configured to receive first data on a first channel of the twin-wire bus during a first time period following a transition of the synchronization signal to a first state; and a second circuit configured to receive second data on a second channel of the twin-wire bus during a second time period following said transition of the synchronization signal to said first state, wherein the first and second time periods of the synchronization signal are non-overlapping in time and wherein the first channel is independent of the second channel, wherein the second time period begins after a hold time following a falling edge of the synchronization signal and ends on a next rising edge of the synchronization signal.

16. A transceiver for transmitting and receiving data over a twin-wire bus carrying a data signal and a synchronization signal, comprising:

a first transmitter circuit configured to transmit first data on a first channel of the twin-wire bus during a first time period following a transition of the synchronization signal to a first state;

a second transmitter circuit configured to transmit second data on a second channel of the twin-wire bus during a second time period following said transition of the synchronization signal to said first state, wherein the first and second time periods of the synchronization signal are non-overlapping in time and wherein the first channel is independent of the second channel;

a first receiver circuit configured to receive the first data on the first channel of the twin-wire bus during the first time period of the synchronization signal; and a second receiver circuit configured to receive the second data on the second channel of the twin-wire bus during the second time period of the synchronization signal, wherein the second time period begins after a hold time following a falling edge of the synchronization signal and ends on a next rising edge of the synchronization signal.

* * * * *